No. 635,046. Patented Oct. 17, 1899.
H. C. JONES.
UPHOLSTERING MACHINE.
(Application filed July 29, 1899.)
(No Model.) 7 Sheets—Sheet 1.
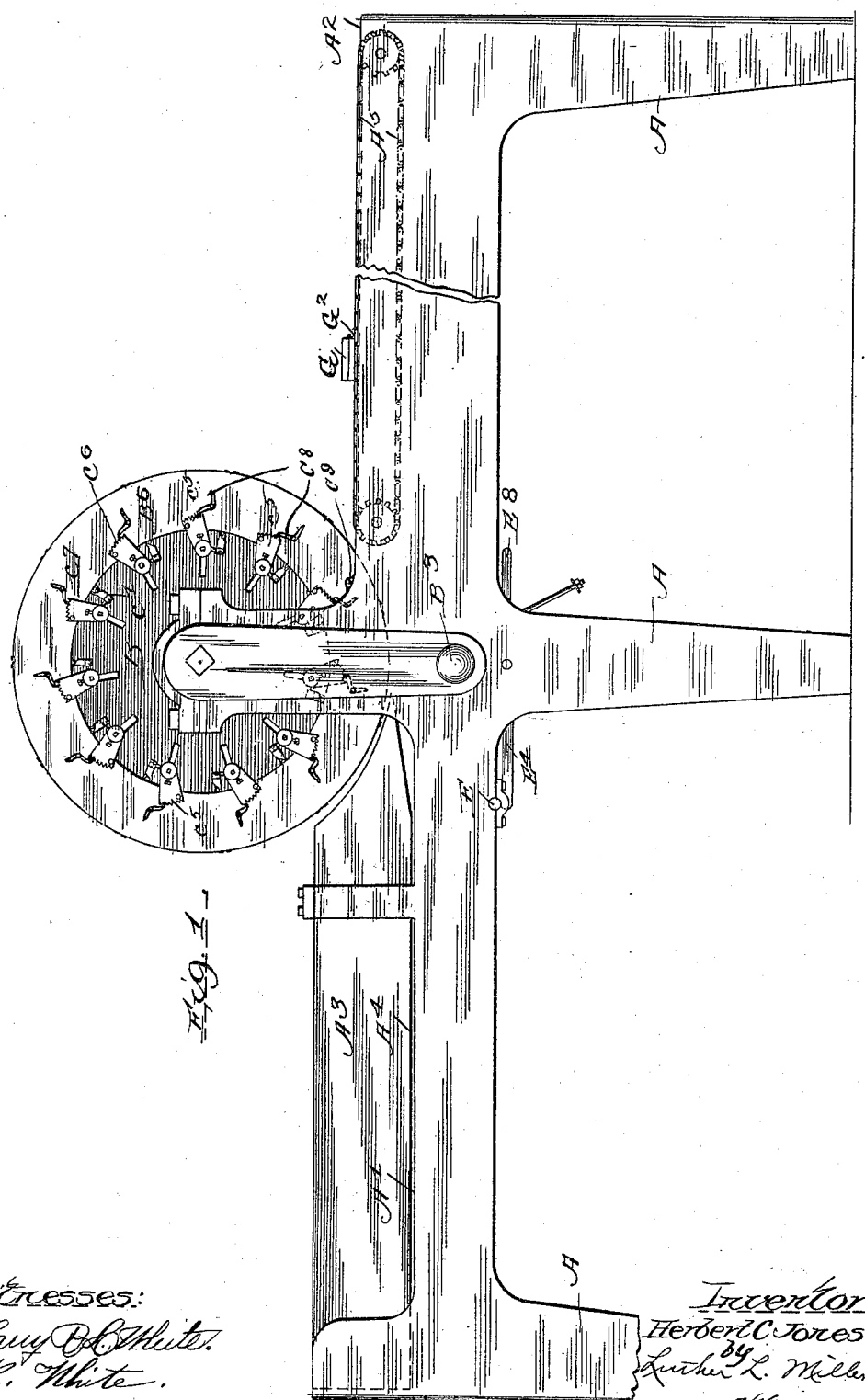

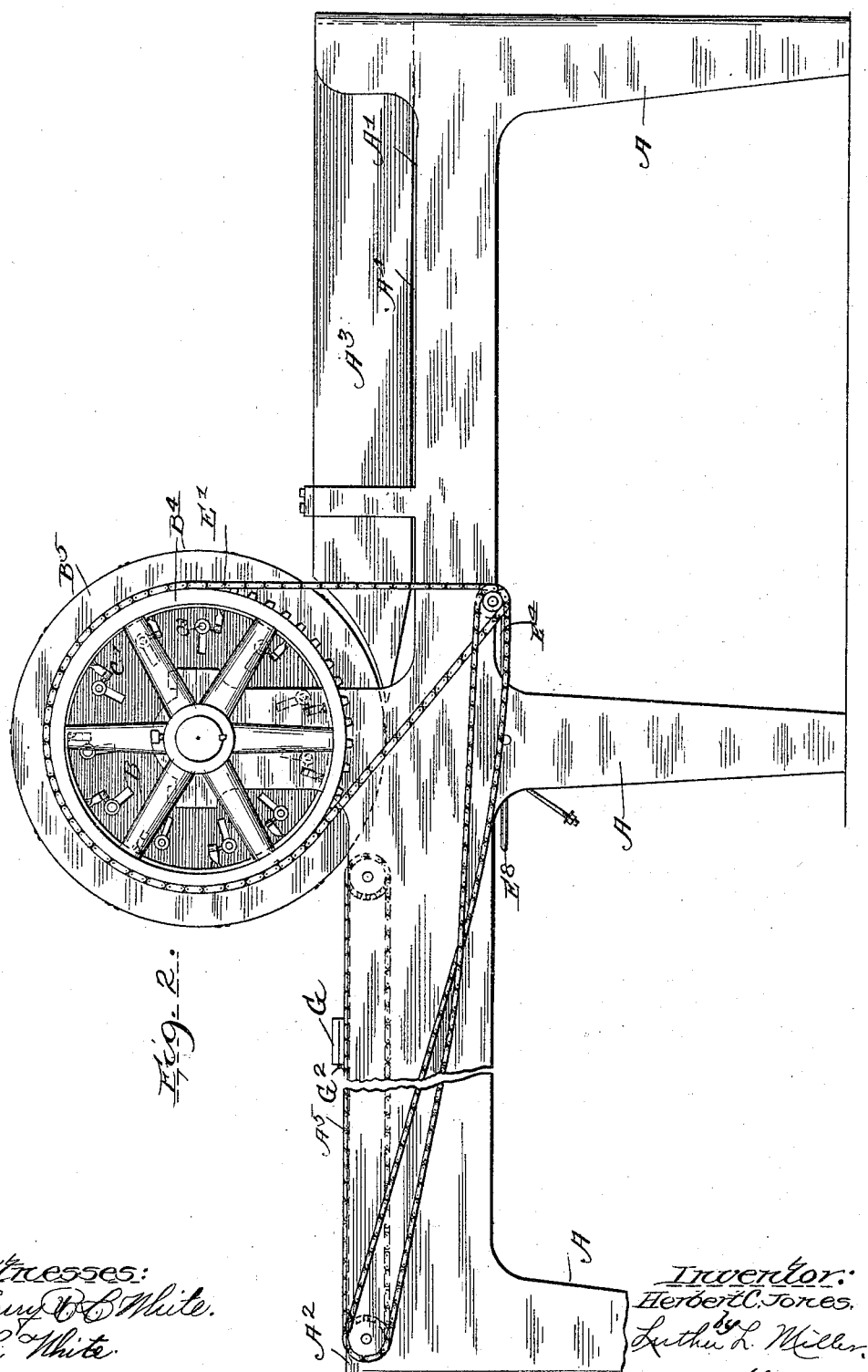

No. 635,046. Patented Oct. 17, 1899.
H. C. JONES.
UPHOLSTERING MACHINE.
(Application filed July 29, 1899.)
(No Model.) 7 Sheets—Sheet 3.
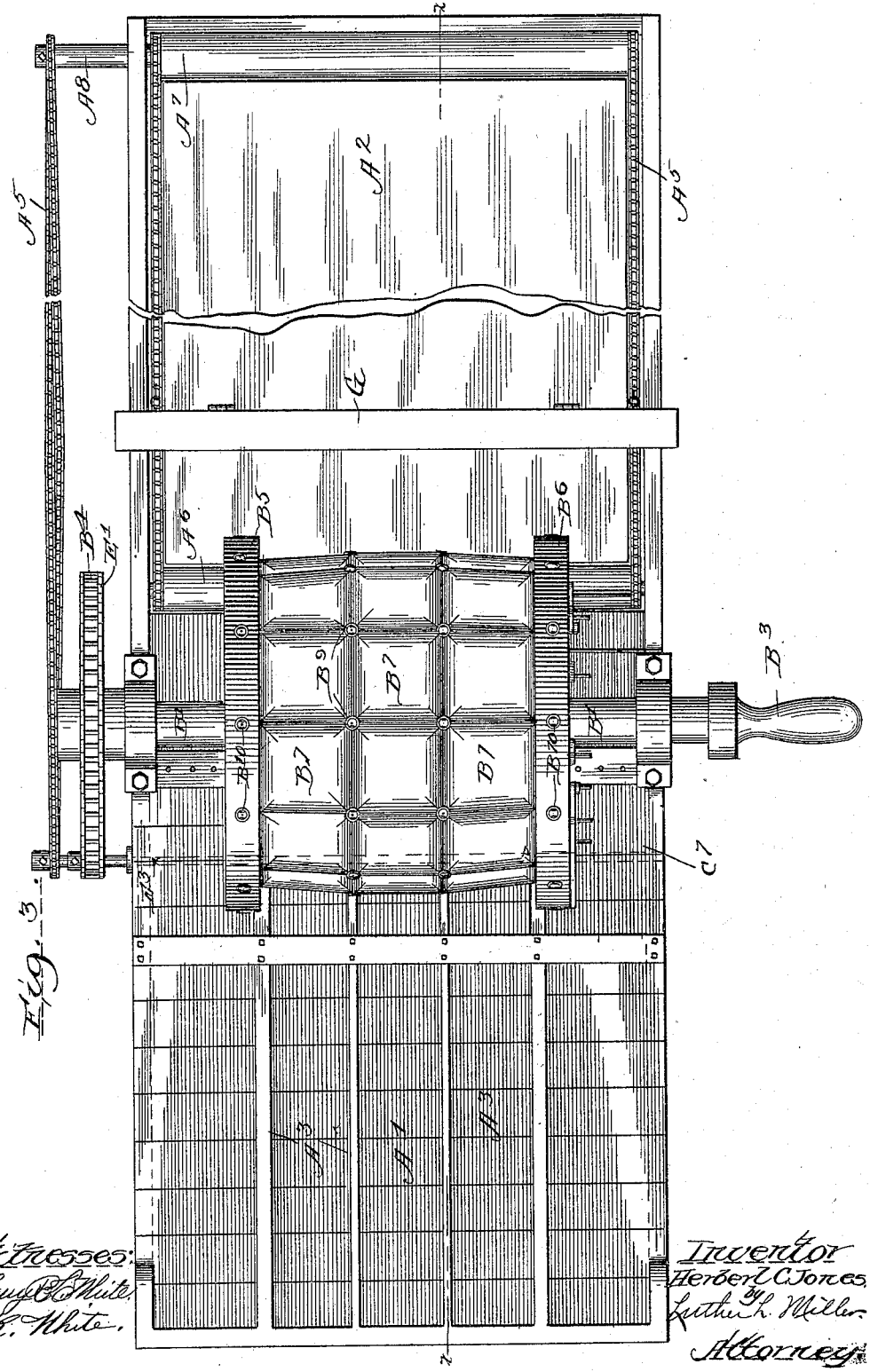

No. 635,046. Patented Oct. 17, 1899.
H. C. JONES.
UPHOLSTERING MACHINE.
(Application filed July 29, 1899.)
(No Model.) 7 Sheets—Sheet 4.
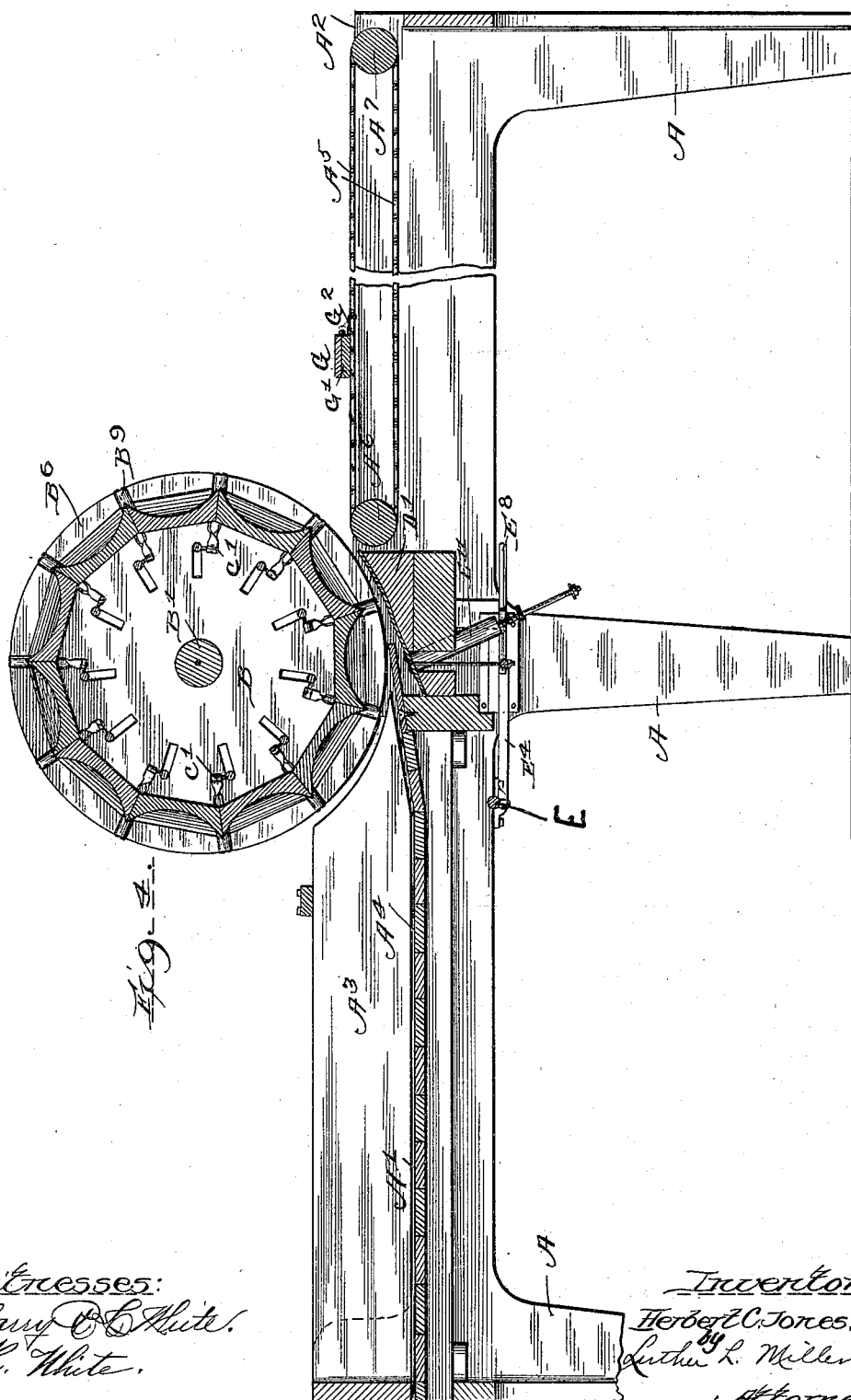

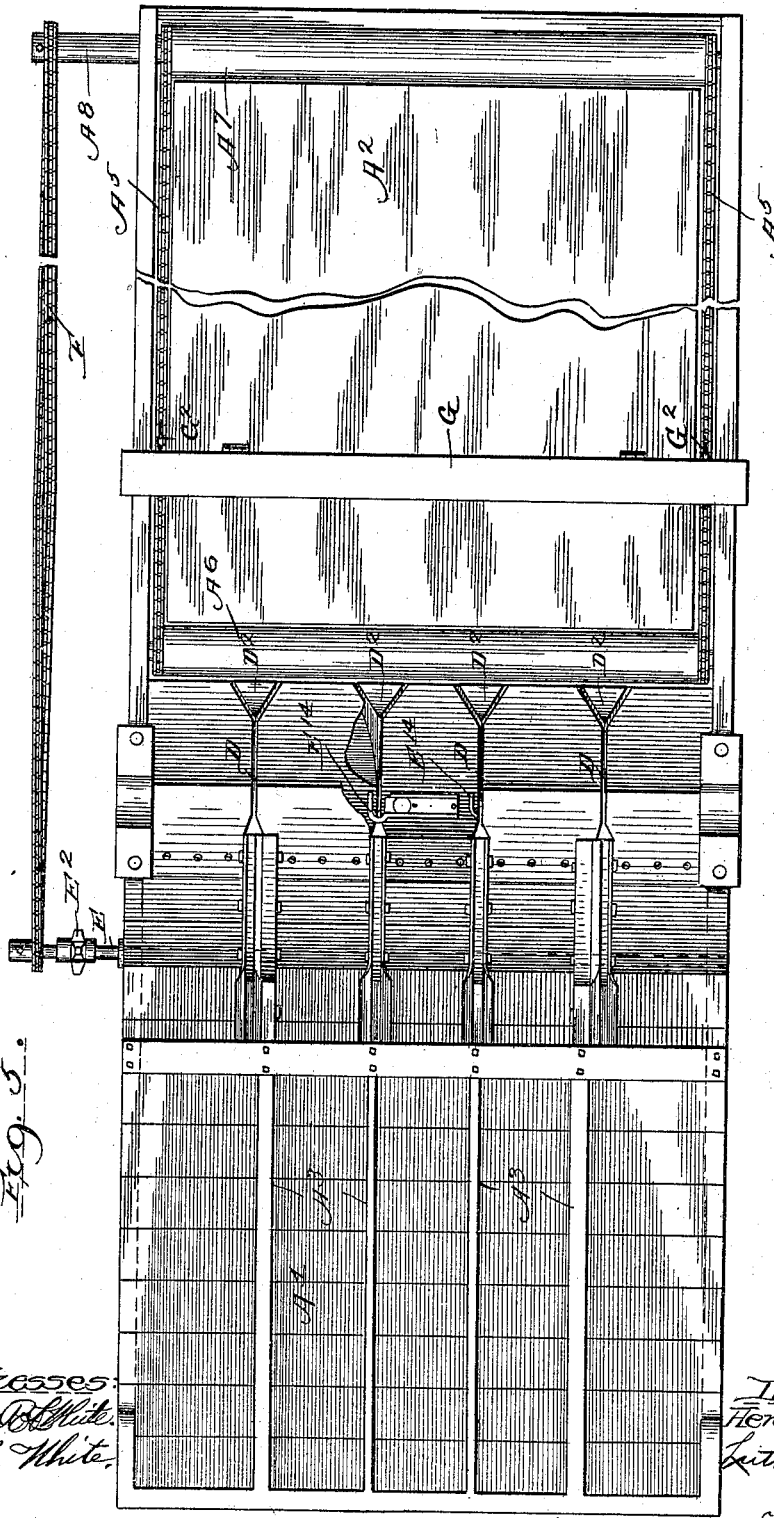

No. 635,046. Patented Oct. 17, 1899.
H. C. JONES.
UPHOLSTERING MACHINE.
(Application filed July 29, 1899.)
(No Model.) 7 Sheets—Sheet 6.
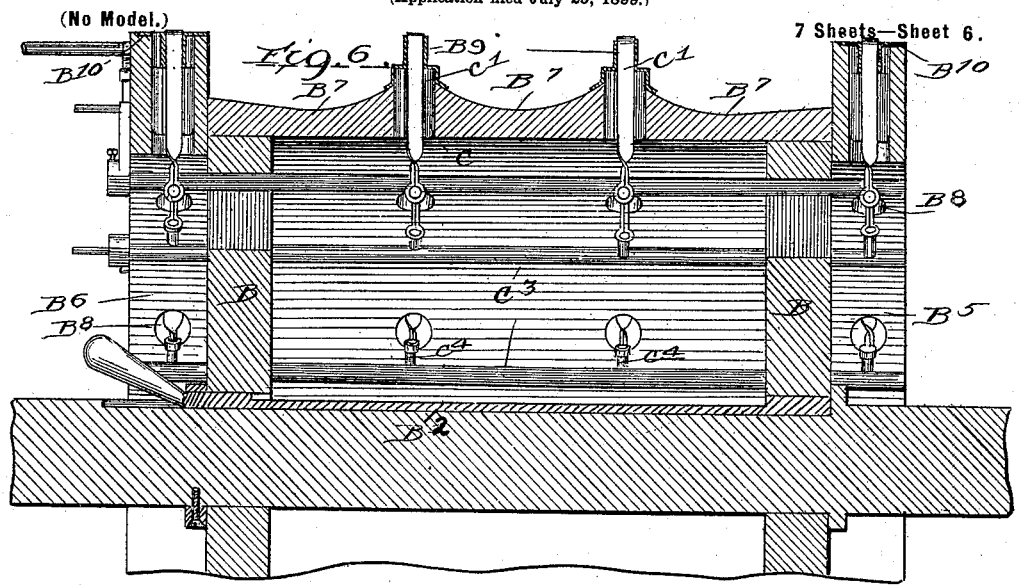
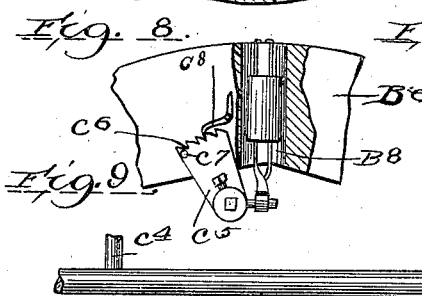
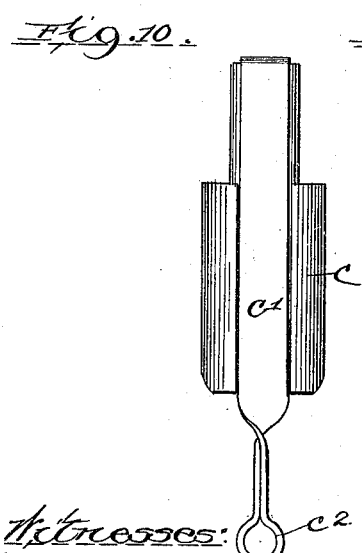
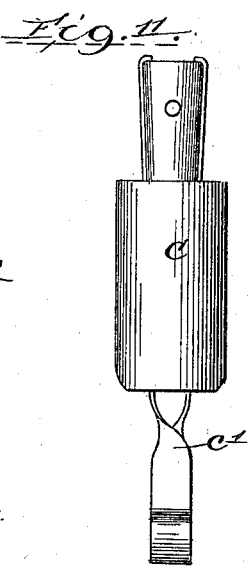
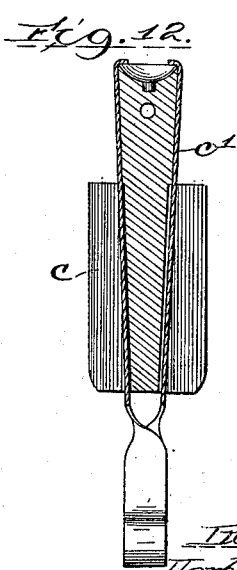
Witnesses:
Harry C. White.
R. White.
Inventor
Herbert C. Jones
by Luther L. Miller
Attorney.
THE NORRIS PETERS CO., PHOTO-LITHO., WASHINGTON, D. C.

No. 635,046. Patented Oct. 17, 1899.
H. C. JONES.
UPHOLSTERING MACHINE.
(Application filed July 29, 1899.)
(No Model.) 7 Sheets—Sheet 7.
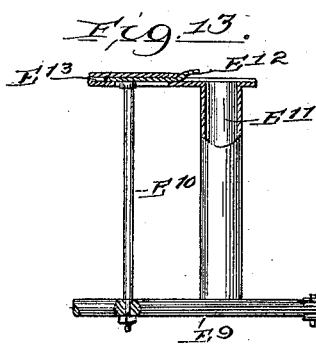
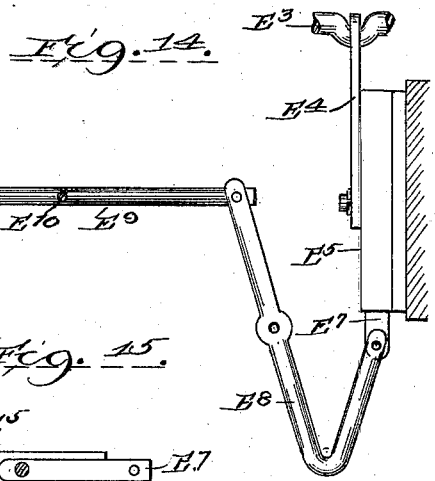
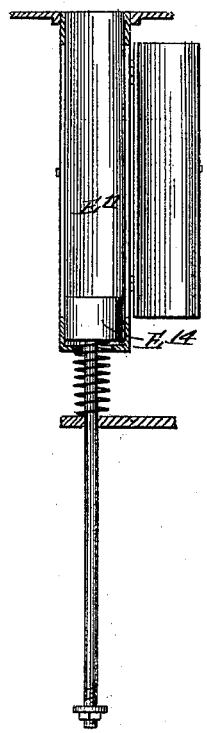
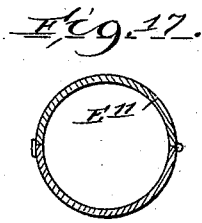
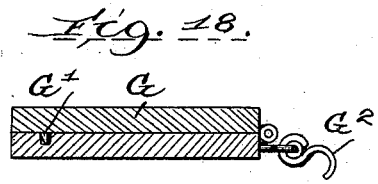
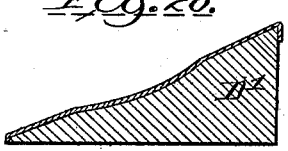
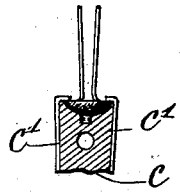
Witnesses:
Harry C. White.
R. White.
Inventor:
Herbert C. Jones.
by Luther L. Miller
Attorney.

UNITED STATES PATENT OFFICE.

HERBERT C. JONES, OF CHICAGO, ILLINOIS, ASSIGNOR OF ONE-HALF TO RUDOLPH DEIMEL, OF SAME PLACE.

UPHOLSTERING-MACHINE.

SPECIFICATION forming part of Letters Patent No. 635,046, dated October 17, 1899.

Application filed July 29, 1899. Serial No. 725,461. (No model.)

*To all whom it may concern:*

Be it known that I, HERBERT C. JONES, a citizen of the United States, residing at Chicago, in the county of Cook and State of Illinois, have invented certain new and useful Improvements in Upholstering-Machines, of which the following is a specification.

The object of this invention is the production of a machine for making the upholstered tops or covers of couches and other articles of furniture.

In the accompanying drawings, Figure 1 is a side elevation of this upholstering-machine. Fig. 2 is a side elevation of the opposite side of said machine. Fig. 3 is a plan view. Fig. 4 is a longitudinal vertical section on dotted line $x\ x$ of Fig. 3. Fig. 5 is a plan view showing the drum removed. Fig. 6 is a sectional view of the upper portion of the drum, illustrating the means of holding the button-staples in position. Fig. 7 is a vertical central section of a metallic thimble for guiding the outer end of each of the button-staple-holding devices. Fig. 8 illustrates the device for locking the button-holding jaws. Fig. 9 is a side elevation of a portion of the rod which reciprocates the washer-feeding slides. Fig. 10 is an elevation of the button-holding mechanism. Fig. 11 is a side elevation of the same. Fig. 12 is a vertical central section through said mechanism. Fig. 13 illustrates the device for feeding the washers into the path of the button-staples. Fig. 14 shows the means of actuating the feeding-slides for said washer-feeding devices. Fig. 15 is a connecting-link in said feeding mechanism. Fig. 16 is a view of the washer-holding magazine for the feeding device, showing the same open for the insertion of washers. Fig. 17 is a transverse section of said washer-holding magazine. Fig. 18 is a clamp for drawing the burlap through the machine. Figs. 19 and 20 are views of the clenching-blocks for the button-staples. Fig. 21 is a view of one of the washers, and Fig. 22 a side view of a button-staple grasped in the holding-jaws.

Like letters of reference indicate corresponding parts throughout the several views.

In the construction of this machine I provide a supporting-frame A, upon which are formed the table-surfaces $A'$ and $A^2$ at opposite ends thereof, the table $A'$ at the forward end and the table $A^2$ at the rear end of the machine. Vertical partitions $A^3$ are suspended over the table-surface $A'$, forming a throat $A^4$ between said partitions and said table-surface, and two chain belts $A^5$ extend along the sides of the table-surface $A^2$. The upper sides of said chain belts $A^5$ are arranged to travel toward the rear end of the table $A^2$, constituting a carrier for said machine. The chain belts $A^5$ run upon sprockets at the outer ends of the rollers $A^6$ and $A^7$, the latter roller being mounted upon the shaft $A^8$.

A drum B is revolubly mounted in the upper portion of the supporting-frame A, being supported upon the shaft $B'$, and by means of the sliding feather $B^2$ is made rigid with said shaft or free to rotate loosely thereon, as desired by the operator. The shaft $B'$ bears the hand-crank $B^3$, fixed thereon at one of its ends, and the sprocket-wheel $B^4$, fixed on said shaft at its opposite end. The drum B comprises the two end rings $B^5$ and $B^6$, and intermediate said rings its surface is formed into biscuit-molding depressions $B^7$ of rectangular outline. At the corners of said rectangles are provided circular openings $B^8$ for the reception of button-staple holders to be later described. Similar openings are provided at intervals in the end rings $B^5$ and $B^6$. $B^9$ are caps or guards for said button-staple-holding devices, and $B^{10}$ are thimbles for a like purpose.

C is the body portion of one of the several button-staple holders, and $C'$ are the holding-jaws, composed of a single piece of spring material looped intermediate its ends to form the eye $C^2$. Shafts $C^3$ are mounted in the end rings $B^5$ and $B^6$ of the drum B and have the studs $C^4$ rigidly fixed thereto. These studs extend within the eyes $C^2$ of the jaws $C'$, by which arrangement the jaws are vertically moved, and thus opened and closed by an oscillation of the shaft $C^3$. One of the crank-arms $C^5$ is fixed on the end of each of said shafts $C^3$ outside of the ring $B^6$, the arm of which crank is in segmental form and has the ratchet-teeth $C^6$ upon its peripheral arc. $C^7$ is a crank-handle for each of said crank-arms.

$C^8$ are pawls pivotally mounted on the side of the ring $B^6$ adjacent to the crank-arms $C^5$ and capable of engagement with the ratchet-teeth $C^6$, their purpose being to insure the holding of the button-staple between the spring-jaws $C'$.

$C^9$ is a tripping-stud rigidly secured to the supporting-frame A and extending into the path of the pawls $C^8$. The rotation of the drum B brings the pawls $C^8$ successively into engagement with the tripping-stud $C^9$, withdrawing said pawls from the ratchet-teeth $C^6$, thus at the proper moment releasing the button-staples from the holding-jaws $C'$. The crank-handle $C^7$ is provided for tightening the holding-jaws upon the button-staples when the latter are inserted between said jaws.

Referring to Fig. 5, D are channels in the supporting-frame A, provided for the passage of the button-staples when the latter are held in the jaws of their holders and rotated with the drum B. These channels are contracted at a point about midway of their length and are there provided with the wedge-shaped clenching-blocks $D'$. These clenching-blocks are made narrow at their forward ends for separating the points of the staples, merging into the flat surfaces $D^2$ at their upper ends in order to complete the clenching process. Just before encountering the clenching-blocks $D'$ the button-staple passes through a washer. The mechanism for placing said washer in the path of said staple will be next described.

Referring to Fig. 4 the shaft E is journaled in the supporting-frame A and extends transversely across said frame. Rotary motion is imparted to said shaft by means of the chain belt $E'$ passing over the sprocket-wheel $B^4$ and the sprocket $E^2$, the latter being fixed on the shaft E. The shaft E is provided intermediate its ends with the crank $E^3$, and the crank-rod $E^4$ connects said crank with a reciprocating block $E^5$, sliding in the ways $E^6$. A link $E^7$ connects the sliding block $E^5$ with a pivoted angle-lever $E^8$, and this angle-lever in turn has a pivotal connection with a reciprocating rod $E^9$. This last-mentioned rod has the upwardly-extending stems $E^{10}$, each one of which stems has an engagement with each of the four slides for feeding the washers into the paths of the button-staples as the latter are rotated by the drum B. This feed mechanism is illustrated in Fig. 13, $E^{11}$ being the washer-holding magazine and $E^{12}$ the slide reciprocated in the guideways $E^{13}$ by the movement of the stem $E^{10}$. The slide $E^{12}$ pushes the washer into the pocket $E^{14}$ formed for its reception and where it lies until it is picked up by the sharp end of a button-staple at a point in the operation of the machine just previous to the clenching of said staple. The washer-holding magazine $E^{11}$ is severed longitudinally, the parts being hinged together. Washers are inserted in said magazine by opening one side of its cylinder upon its hinges. A spring-actuated follower $E^{15}$ holds the supply of washers in the magazine upward to be engaged by the feed-slides $E^{12}$.

Rotary motion is communicated to the shaft $A^8$ by means of the chain belt F.

G is a clamp having two hinged members for holding between their adjacent faces the end of the burlap to be drawn through the machine, engaging teeth $G'$ preventing the fabric from slipping from between the members of the clamp. A hook $G^2$ at each end of said clamp engages the chain belt $A^5$ and causes said clamp to be drawn across the table $A^2$ with said chain belts.

In the operation of this machine a roll of burlap will be mounted at the front end thereof and a thickness of that fabric drawn into the machine through the throat $A^4$, its end fixed in the clamp G and said clamp secured to the chain belts $A^5$. The sliding feather $B^2$ is drawn outward, permitting the drum B to be rotated freely upon the shaft $B'$. Button-staples are set in the holding-jaws $C'$ and said jaws clamped and locked upon the heads of said staples by turning the shafts $C^3$ by means of the crank-handle $C^7$, locking them in position by the pawls $C^8$. The covering goods or leather for the upholstering is next placed upon the drum B, letting the sharp button-staples puncture the fabric, and hair, moss, or other suitable filling material of an even thickness is placed in the spaces between the vertical partitions $A^3$ upon the burlap in the throat $A^4$. The sliding feather $B^2$ is pushed inward, locking the drum B rigid with its shaft $B'$, and both are rotated by means of the hand-crank $B^3$. The button-staples on the under side of the drum B puncture the burlap as the drum is rotated and at a certain point enter the central openings of the washers in the pockets $E^{14}$. A further rotation of the drum B brings the points of the button-staples against the sharp ends of the clenching-blocks $D'$, separating the ends of the staples, and as the rotation continues bending them upward and laterally outward by reason of the wedging conformation of said clenching-blocks $D'$. The flattened face on the end of each of the wedges clenches the sharp ends of the button-staples down flat, completing that operation. The rotation of the drum B moves the chain belts $A^5$ toward the rear of the machine and at the same time draws the burlap through the throat $A^4$ and under the drum B, carrying with said burlap the hair or other packing placed upon the burlap between the vertical partitions and uniting the burlap to the covering material placed upon the drum, as hereinbefore described, with the packing material between and clenching the two fabrics together by means of the said button-staples. When the cover has been upholstered, the burlap is cut off, the clamp G affixed to the end thus formed, a second cover spread upon the drum with the button-staples in place, and the operation of running the two fabrics through the machine repeated. The drum is intended to be large enough to accommodate a covering for the longest couches—say about six feet in circumference.

I claim as my invention—

1. In an upholstering-machine, in combination, a supporting-frame; a drum rotatably mounted thereon; holding mechanism supported by said drum, for the means for securing together the materials to be upholstered, which holding mechanism comprises holding-jaws and an oscillatory shaft for moving said jaws; means for rotating said drum, and for moving said materials upon the supporting-frame; and a stationary wedge-shaped clenching-block in the paths of said securing means, for clenching said securing means as the same travel across the wedging-surfaces of said clenching-block.

2. In an upholstering-machine, in combination, a supporting-frame; a drum rotatably mounted thereon; a series of holders supported by the drum, for the means for securing together the materials to be upholstered, which holders comprise holding-jaws and oscillatory shafts for moving said jaws; means for rotating said drum, and for moving said materials upon the supporting-frame; and a series of stationary wedge-shaped clenching-blocks fixed in the paths of said securing means, for clenching said securing means as the same travel across the wedging-surfaces of said clenching-blocks.

3. In an upholstering-machine, in combination, a supporting-frame; a table-surface thereon; vertical partitions above said table-surface; a drum rotatably mounted upon the supporting-frame; a series of holders supported by said drum, for the means for securing together the materials to be upholstered, each of which holders comprises holding-jaws; oscillatory shafts for moving the jaws of said holders; and means for rotating said drum, and for moving said materials upon the supporting-frame.

4. In an upholstering-machine, in combination, a supporting-frame; a table-surface thereon; vertical partitions above said table-surface; a drum rotatably mounted upon the supporting-frame; a series of holders supported by said drum, for the securing means, which holders comprise holding-jaws; an oscillatory shaft for moving said jaws; studs on said shaft; securing means for said shaft; means for rotating said drum; and a series of wedge-shaped clenching-blocks fixed in the paths of said securing means, for clenching said securing means as the same travel across the wedging-surfaces of said clenching-blocks.

5. In an upholstering-machine, in combination, a supporting-frame; a table-surface thereon; vertical partitions above said table-surface; a drum rotatably mounted upon the supporting-frame; a series of holders for the fastening means, which holders comprise two holding-jaws; an oscillatory shaft mounted in said drum; studs on said shaft for moving said jaws; an arm on said shaft; a ratchet for engaging said arm; a stud on the supporting-frame for releasing the engagement of said ratchet; and means for rotating said drum.

6. In an upholstering-machine, in combination, a supporting-frame; a table-surface thereon; vertical partitions above said table-surface; a drum rotatably mounted upon the supporting-frame; a series of holders for the securing means, which holders comprise holding-jaws; a series of oscillatory shafts mounted in said drum, for moving said holding-jaws to engage or disengage the securing means; a pawl and ratchet for each of said oscillatory shafts; and a series of stationary wedge-shaped clenching-blocks in the paths of said securing means, for clenching said securing means as the same travel across the wedging-surfaces of said clenching-blocks.

7. In an upholstering-machine, in combination, a supporting-frame; a table-surface thereon; vertical partitions above said table-surface; a drum rotatably mounted upon the supporting-frame; a series of holders for the button-staples, supported by said drum, each of which holders comprises holding-jaws; a series of oscillatory shafts; studs on said shafts, for moving said jaws; said supporting-frame having a channel for the passage of said button-staples when the drum is rotated; a stationary wedge-shaped clenching-block in the path of said securing means, for clenching said securing means as the same travel across the wedging-surfaces of said clenching-block; and means for rotating said drum.

8. In an upholstering-machine, in combination, a supporting-frame; a table-surface thereon; vertical partitions above said table-surface; a drum rotatably mounted upon the supporting-frame, which drum has depressions of rectangular outline opon its periphery; a holder for the securing means at the adjacent corners of said rectangular depressions, which holder comprises holding-jaws; a series of oscillatory shafts mounted in said drum; studs on said shafts, for engaging and moving said jaws; a pawl and ratchet for each of said shafts; a stud fixed on the supporting-frame, for engaging said pawl; a series of stationary wedge-shaped clenching-blocks in the paths of said securing means, for clenching said securing means as the same travel across the wedging-surfaces of said clenching-blocks; and means for rotating said drum.

9. In an upholstering-machine, in combination, a supporting-frame; a table-surface thereon; vertical partitions above said table-surface; a drum rotatably mounted upon the supporting-frame, which drum has depressions of rectangular outline upon its periphery; a holder for the securing means at each of the adjacent corners of said rectangular depressions, which holders comprise holding-jaws; a series of oscillatory shafts mounted in said drum; studs on said shafts, for engaging and moving said holding-jaws, to engage or disengage said securing means; said supporting-frame having channels for said securing means; a stationary wedge-shaped clenching-block fixed at the end of each of said channels, for clenching said securing means as the same travel across the wedging-surfaces of said clenching-blocks; and means for rotating said drum, and moving said materials upon said supporting-frame.

10. In an upholstering-machine, in combination, a supporting-frame; a table-surface thereon; vertical partitions above said table-surface; a drum rotatably mounted upon the supporting-frame, which drum has depressions of rectangular outline upon its periphery; holding-jaws for the fastening means at the adjacent corners of said rectangular depressions; a shaft capable of an oscillatory movement mounted in said drum; studs fixed on said shaft, which studs engage said holding-jaws; and means for rotating said drum.

11. In an upholstering-machine, in combination, a supporting-frame; a table-surface thereon; vertical partitions above said table-surface; a drum rotatably mounted upon the supporting-frame; a series of holders for the fastening means; means for actuating said holders to engage or disengage said fastening means; said supporting-frame having channels for the passage of the fastening means when said drum is rotated; a clenching-block located at the end of each of said channels; a magazine for holding a number of washers; a feed-slide for projecting said washers into said channel and into the path of said fastening means; and means for rotating said drum and actuating said slide.

12. In an upholstering-machine, in combination, a supporting-frame; a table-surface thereon; vertical partitions above said table-surface; a drum rotatably mounted upon the supporting-frame, which drum is provided with a series of holders for the button-staples; means for actuating said holders to engage or disengage said button-staples; said supporting-frame having channels for the passage of said staples when the drum is rotated; a clenching-block at the end of each of said channels; a washer-pocket in each of said channels; a washer-holding magazine; a reciprocatory feed-slide for said magazine; and means for rotating said drum and actuating said feed-slide.

13. In an upholstering-machine, in combination, a supporting-frame; a table-surface thereon; vertical partitions above said table-surface; a drum rotatably mounted upon the supporting-frame; a series of holders for the button-staples, which holders comprise two jaws; an oscillatory shaft mounted in said drum, having studs for moving said jaws; an arm on said shaft; a pawl for engaging said arm; a stud fixed on the supporting-frame for engaging said pawl; said supporting-frame having channels for the passage of the button-staples when the drum is rotated; clenching-blocks at the ends of said channels; a washer-magazine; an oscillatory feed-slide therefor; a lever for actuating said feed-slide; a chain belt at the rear end of the supporting-frame for moving the material to be upholstered through the machine; a clamp connected with said chain belt; means for rotating said drum, for actuating said feed-slide and said chain belt.

14. In an upholstering-machine, in combination; a supporting-frame; a table-surface thereon; vertical partitions above said table-surface; a drum rotatably mounted upon the supporting-frame, which drum has depressions of rectangular outline upon its periphery, and also has two rings at its ends; a button-staple holder at the adjacent corners of said rectangular depressions, also at intervals in the periphery of said rings, which holders comprise two holding-jaws; a shaft for said drum; a crank on said shaft; said supporting-frame being provided with channels for the passage of said button-staples when the drum is rotated; a clenching-block at the end of each of said channels; a washer-pocket in the path of said button-staples; a washer-magazine; a reciprocatory slide for feeding said washers into said pocket; a lever for actuating said slide; a crank-shaft; a connecting-rod between the lever and the crank-shaft; a chain belt extending from the drum-supporting shaft to said crank-shaft; two chain belts at opposite sides of the supporting-frame; a clamp having connection with said last-mentioned chain belts; supporting-rollers for said last-mentioned chain belts; and a chain belt extending from said last-mentioned crank-shaft to one of said rollers.

15. In a holder for button-staples, in combination, a body portion having two inclined surfaces; two jaws lying adjacent to said surfaces, which jaws are formed from spring material, and are provided with a loop at their inner ends; an oscillatory shaft; and a stud on said shaft for engaging said loop.

HERBERT C. JONES.

Witnesses:
L. L. MILLER,
GEO. L. CHINDAHL.